United States Patent [19]

Lu et al.

[11] 4,376,800

[45] Mar. 15, 1983

[54] OPTICAL LENSES PREPARED FROM CROSSLINKABLE ACRYLIC COMPOSITIONS

[76] Inventors: Chen-i Lu; Edward D. Morrison, both of 1669 Lake Ave., Rochester, N.Y. 14650

[21] Appl. No.: 253,481

[22] Filed: Apr. 13, 1981

[51] Int. Cl.$^3$ ............................................. C08F 22/38
[52] U.S. Cl. ..................................... 428/220; 264/1.1; 264/1.4; 523/106; 526/301; 526/321
[58] Field of Search ................... 264/1.4, 1.1; 428/220; 526/301, 321; 523/106

[56] References Cited

U.S. PATENT DOCUMENTS

| | | | |
|---|---|---|---|
| 3,509,234 | 4/1970 | Burlant et al. | 260/859 |
| 3,694,415 | 9/1972 | Honda et al. | 260/859 |
| 3,719,638 | 3/1973 | Huemmer et al. | 260/859 |
| 3,775,377 | 11/1973 | Kokawa | 260/77.5 |
| 3,830,460 | 8/1974 | Beattie | 249/134 |
| 4,017,238 | 4/1977 | Robinson | 425/174.6 |
| 4,092,173 | 5/1978 | Novak et al. | 204/159.23 |
| 4,166,088 | 8/1979 | Neefe | 264/1 |
| 4,227,980 | 10/1980 | Pregitzer et al. | 204/159.23 |

FOREIGN PATENT DOCUMENTS

| | | |
|---|---|---|
| 855659 | 12/1977 | Belgium . |
| 2637257 | 2/1977 | Fed. Rep. of Germany . |
| 2929313 | 1/1980 | Fed. Rep. of Germany ....... 264/1.1 |
| 49-064691 | 6/1974 | Japan . |
| 1321372 | 6/1973 | United Kingdom . |

*Primary Examiner*—James B. Lowe
*Attorney, Agent, or Firm*—J. L. Tucker

[57] ABSTRACT

An optical lens having an absorbance of less than about 0.1 for visible radiation of a wavelength in the range of from about 400 to about 600 nanometers is prepared from a crosslinkable acrylic composition. The composition consists essentially of an acrylic monomer and an acrylated urethane oligomer and exhibits a shrinkage upon curing of less than about 0.4%. The lens is prepared by introducing the crosslinkable composition into a lens-forming means and curing it until it is substantially crosslinked.

9 Claims, No Drawings

OPTICAL LENSES PREPARED FROM CROSSLINKABLE ACRYLIC COMPOSITIONS

FIELD OF THE INVENTION

This invention relates in general to organic compositions and plastic optical lenses prepared therefrom. More specifically, this invention relates to crosslinkable compositions and optical lenses, e.g. camera lenses, prisms and the like, having improved optical clarity which are prepared from such crosslinkable compositions. It also relates to a method of making such lenses.

BACKGROUND OF THE INVENTION

It is known that certain synthetic resins can be used to form moldable materials which display useful optical properties. The use of such resins for making optical lenses has increased rapidly in recent years due to the advantages plastic lenses have over glass lenses, e.g. resistance to breakage and reduced weight.

Plastic lenses have generally been prepared by injection molding or other techniques requiring melting of the resin. However, these techniques are suitable for heat-stable resins only. Such resins do not always exhibit acceptable optical properties, e.g. high refractive index and optical clarity. Other resins, which have potentially-desirable optical properties, lack poor stability and can be injection molded over only a narrow temperature range, if at all.

It is desirable, therefore, to have fabrication methods which would not require melting of the resin. One possibility would be to cast a lens from a solution of a resin in organic solvent. However, conventional solvent-based formulations cure too slowly due to slow solvent evaporation, and exhibit bubble entrapment and unpredictable lens shrinkage. Obviously, slow curing formulations cannot be used in high speed manufacturing operations. Bubble entrapment and lens shrinkage result in unacceptable optical qualities.

SUMMARY OF THE INVENTION

In accordance with this invention, we have found that particular crosslinkable compositions can be used to prepare optical lenses having desired optical properties, e.g. high refractive index, optical clarity and high scratch resistance while effectively avoiding the aforementioned problems. In practicing this invention, we have obviated the need for heat-stable resins. Furthermore, we have found that the compositions described herein exhibit very little shrinkage when cured and can be used to prepare optical lenses free of bubbles. Instead of using slow-to-evaporate organic solvents to form resin formulations, we have used crosslinkable monomers which become a part of the lens. Such lenses can be made very quickly in mass production operations.

More specifically, this invention provides an optical lens having an absorbance of less than about 0.1 for visible radiation of a wavelength in the range of from about 400 to about 600 nanometers. Such lens is prepared by introducing into a lens-forming means a cross-linkable composition consisting essentially of an acrylic monomer and an acrylated urethane oligomer. This crosslinkable composition exhibits a shrinkage of less than about 0.4% upon curing. Curing is carried out in the lens-forming means until the composition is substantially crosslinked.

In addition, this invention provides a method of making such an optical lens. Such method includes introducing the crosslinkable composition described hereinabove into a lens-forming means, such as a mold, and curing the composition in such means until it is substantially crosslinked.

DETAILED DESCRIPTION OF THE INVENTION

An essential component of the crosslinkable compositions of this invention is an acrylated urethane oligomer. Any acrylated urethane oligomer or mixture thereof can be used as long as it is readily crosslinked by application of suitable radiation or heat and lenses prepared therefrom have the desired optical properties, namely an absorbance of less than about 0.1 for visible radiation of a wavelength in the range of from about 400 to about 600 nanometers. Typical acrylated urethane materials are described, for example, in U.S. Pat. Nos. 3,509,234 (issued Apr. 28, 1970 to Burlant et al); 3,694,415 (issued Sept. 26, 1972 to Honda et al); 3,719,638 (issued Mar. 6, 1973 to Huemmer et al); 3,775,377 (issued Nov. 27, 1973 to Kokawa); 4,092,173 (issued May 30, 1978 to Novak et al) and 4,227,980 (issued Oct. 14, 1980 to Pregitzer et al); and in U.K. Patent Specification No. 1,321,372 (published June 27, 1973).

In a preferred embodiment of this invention, useful acrylated urethane oligomers have the formula:

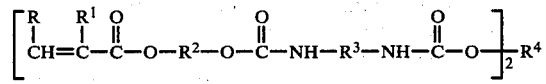

wherein each of R and $R^1$ is hydrogen; methyl; or halo, such as fluoro, chloro or bromo. Preferably, each of R and $R^1$ is hydrogen.

Each of $R^2$ and $R^3$ is alkylene typically of from 1 to 8 carbon atoms, such as methylene, ethylene, 2,2-dimethylpropylene, 2-chloropropylene, pentylene, hexylene, etc.; cycloalkylene typically of from 5 to 10 carbon atoms, such as cyclopentylene, cyclohexylene, 1,4-cyclohexylenedimethylene, etc.; or arylene typically of from 6 to 12 carbon atoms, such as phenylene, naphthylene, xylylene, tolylene, etc. Preferably, $R^2$ is alkylene and $R^3$ is arylene. More preferably, $R^3$ is phenylene.

$R^4$ is a divalent aliphatic, alicyclic or aromatic radical of at least 2 carbon atoms and includes hydrogen and carbon atoms, and optionally, oxygen atoms. Such aliphatic, alicyclic and aromatic radicals include alkylene, cycloalkylene, arylene, alkenylene, alkynylene, alkylenearylene, alkylenecycloalkylene, alkylenebisarylene, cycloalkylenebisalkylene, arylenebisalkylene, alkylene-oxy-alkylene, alkylene-oxy-arylene-oxyalkylene, arylene-oxy-alkylene, alkylene-oxy-cycloalkylene-oxy-alkylene etc. In addition, such radicals include those derived from polyesters with water molecules split off the ends. Preferably, $R^4$ is alkylene, cycloalkylene or arylene. More preferably, $R^4$ is alkylene.

As an example, the described oligomers can be prepared by reacting a hydroxyl-substituted acrylate of the formula

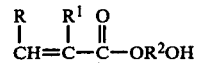

with a diisocyanate of the formula

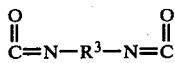

and a diol of the formula HO—R$^4$—OH wherein R, R$^1$, R$^2$, R$^3$ and R$^4$ are as described above. Alternatively, a polyester can be reacted in place of the diol. Such reactants and conditions of reaction are well known to one skilled in the polymer chemistry art.

A preferred acrylate urethane oligomer has the formula

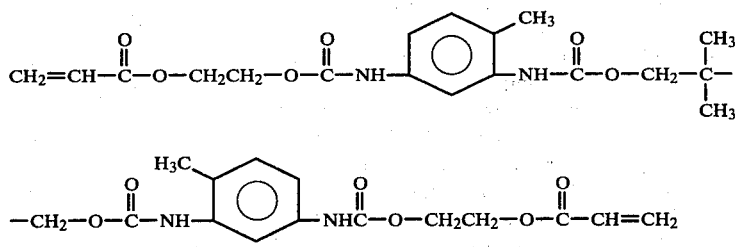

The other essential component of our compositions is an acrylic monomer or mixture thereof. Such monomers include mono- or polyfunctional acrylates, i.e. an acrylic monomer having one or more acrylic ester radicals. Any such acrylic monomer can be used as long as it is readily polymerized by application of suitable radiation or heat and lenses prepared therefrom have the desired optical properties described above.

In a preferred embodiment of this invention, useful acrylic monomers have the formula

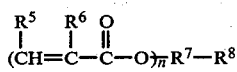

wherein n is 1 to 3 and preferably 2. Each of R$^5$ and R$^6$ is hydrogen; methyl; or halo, e.g. fluoro, chloro or bromo, and preferably hydrogen. R$^7$ is a polyvalent aliphatic, alicyclic or aromatic radical as described for R$^4$ above except that R$^7$ can have 2 or 3 valences (divalent or trivalent). Preferably R$^7$ is alkylene. R$^8$ is hydrogen or

and preferably hydrogen.

Examples of useful acrylic monomers include methyl acrylate, ethyl acrylate, butyl acrylate, 2-ethylhexyl acrylate, 2-hydroxyethyl acrylate, cyclohexyl acrylate, lauryl acrylate, isodecyl acrylate, isobornyl acrylate, methyl methacrylate, α-chloromethyl acrylate, neopentylglycol diacrylate, pentaerythritol triacrylate, 1,6-hexanediol diacrylate, trimethylolpropane triacrylate, tetraethylene glycol diacrylate, 1,3-butyleneglycol diacrylate, trimethylolpropane trimethacrylate, 1,3-butylene glycol dimethacrylate, ethylene glycol dimethacrylate, pentaerythritol tetraacrylate, tetraethylene glycol dimethacrylate, 1,6-hexanediol dimethacrylate, ethylene glycol diacrylate, diethylene glycol diacrylate, glycerol diacrylate, glycerol triacrylate, 1,3-propanediol diacrylate, 1,3-propanediol dimethacrylate, 1,2,4-butanetriol trimethacrylate, 1,4-cyclohexanediol diacrylate, 1,4-cyclohexanediol dimethacrylate, pentaerythritol diacrylate and 1,5-pentanediol dimethacrylate.

The proportions of the acrylated urethane oligomers and acrylic monomers in the compositions of this invention can be varied widely, as desired. Typically, the acrylated urethane oligomer is present in an amount of from about 65 to about 95 percent, and preferably from about 80 to about 90 percent, by weight, based on total composition weight. The acrylic monomer is typically present in an amount of from about 5 to about 35, and preferably from about 10 to about 20 percent, by weight, based on total composition weight. The optimum amounts to use in a particular formulation will depend upon the particular compounds involved and upon the characteristics of the optical lens desired.

Other ingredients can be incorporated in the crosslinkable compositions of this invention, if desired. For example, if curing is to be accomplished with heat, one or more heat curing catalysts can be included. Examples of such catalysts are organic peroxides, e.g. isobutyl peroxide, di(2-ethylhexyl)peroxydicarbonate, acetyl cyclohexane sulfonyl peroxide, 2,4-dichlorobenzoyl peroxide, lauroyl peroxide, t-butyl peroxyoctoate, 2,5-dimethyl-2,5-bis(benzoylperoxy)hexane, t-butyl peroxyacetate, etc.; and azo compounds, e.g. 2,2'-azobis-(isovaleronitrile), 2-t-butylazo-2-cyano-4-methoxy-4-methylpentane, 2,2'-azobis(isobutyronitrile), 2-cyano-4-methylpentane, 2-t-butylazo-2-cyanobutane, 1-t-amylazo-1-cyanocyclohexane, etc. If curing is to be accomplished with ultraviolet irradiation, one or more ultraviolet light photoinitiators can be included in the compositions. Examples of such photoinitiators are 2,2-diethoxyacetophenone; 2,2-dimethoxy-2-phenylacetophenone; benzoin, methyl ether; benzoin, iso-butyl ether; 4,4'-bis(chloromethyl)benzophenone; benzophenone/triethylamine mixtures; benzil; t-butyl-α-trichloroacetophenone; etc. Such photoinitiators can also be called sensitizers.

When used, the heat curing catalysts are present in the compositions of this invention typically in an amount of from about 0.5 to about 8, and preferably from about 2 to about 4, percent, by weight based on total composition weight. Similarly, when used, the ultraviolet light photoinitiators or sensitizers are present in such compositions typically in an amount of from about 0.5 to about 8, and preferably from about 2 to about 6, percent, by weight based on total composition weight.

Polymerization inhibitors can be employed in the described crosslinkable compositions in very small amounts to stabilize the compositions prior to curing. Any suitable inhibitor can be used, e.g. free radical inhibitors such as p-methoxyphenol and p-benzoquinone.

The crosslinkable compositions of this invention are useful for preparing optical lenses having an absorbance of less than about 0.1 for visible radiation of a wavelength in the range of from about 400 to about 600 nanometers. Preferably, the absorbance is less than about 0.075 for such visible radiation. Such absorbance can be defined as the negative (−) common or Naperian logarithm of the quotient of the intensity of actinic radiation passing through the lens over the original intensity of actinic radiation. Or, absorbance = $-\log(I/I_o)$ wherein I is intensity passing through the lens and $I_o$ is incident intensity. Absorbance can also be related to percent transmittance which is defined as $(I/I_o) \times 100$. Therefore, absorbance can be defined as $$-\log\left[\frac{\text{percent transmittance}}{100}\right].$$

The lenses of this invention exhibit a percent transmittance typically greater than about 80%, and preferably, greater than about 85%.

The crosslinkable compositions of this invention are substantially completely converted into solid form when cured. In other words, the volume shrinkage upon curing is very small, e.g. typically less than about 0.4%, and preferably, less than about 0.1%. Such low shrinkage is advantageous because it enables one who practices our invention to avoid optical problems which arise with high shrinkage and improves quality control in high speed manufacturing operations.

The lenses of this invention include optical lenses useful in cameras, eyeglasses; contact lenses; prisms; Fresnel lenses; microscopes and other optical instruments. They can be single or multicomponent. The thickness of the lenses can vary widely as long as the desired optical qualities are present. Typically, the lens thickness is in the range of from about 0.01 to about 2.6 centimeters, and preferably from about 0.16 to about 0.65 centimeters. The lenses can be of any suitable size, depending upon the use contemplated. For example, camera lenses typically have a diameter of from about 0.5 to about 20 centimeters. The lenses of this invention can be of any suitable shape, such as round, spherical, aspherical, square, flat, concave or convex. For example, camera lenses are typically round or square.

The lenses of this invention are prepared by introducing the crosslinkable composition of this invention into a suitable lens-forming means, such as a lens-forming mold or platen, and curing the composition until it is substantially crosslinked. Such molds may be made of metal, quartz, silicone rubber or other synthetic resins. The composition can be put into the mold in any suitable manner.

Apparatus for curing the compositions with heat or suitable forms of radiation are well known. Any suitable curing technique can be used in the practice of this invention. For example, curing can be carried out by the application of ultraviolet radiation of suitable intensity from medium pressure mercury arc lamps or other sources of ultraviolet radiation. High energy ionizing radiation such as x-rays, gamma rays, beta rays and accelerated electrons can also be used to cure the compositions. Typically, the radiation used should be of sufficient intensity to penetrate substantially all the way through the composition in the lens-forming means. The total dosage employed should be sufficient to bring about curing of the composition to form a solid plastic article. Typically, for ultraviolet radiation curing, the dosage of radiation is greater than about 0.8 joules per square centimeter, and more usually from about 1.5 to about 7.5 joules/cm$^2$. For electron beam curing, typically the dosage is greater than about 1 megarad and more usually in the range of from about 1 to about 50 megarads. The compositions of this invention are substantially completely convertible to a solid article with curing so that the removal of residual monomer or oligomer is not necessary and shrinkage is minimal.

Curing can also be accomplished by heating the crosslinkable composition, either alone or in conjunction with radiation curing. Typically, curing with heat is carried out at a temperature in the range of from about 50 to about 200° C., and preferably from about 70 to about 90° C. Depending upon the temperature used, curing time is usually greater than 5 seconds, and preferably ranges from about 5 to about 60 minutes.

The invention is further illustrated by the following examples of its practice.

EXAMPLE 1

Crosslinkable Composition

A crosslinkable composition was prepared by combining, 1,6-hexanediol diacrylate (20 g., 19.6 weight %, based on total composition weight), 2-ethylhexyl acrylate (16 g., 15.7 weight %, based on total composition weight), Cargill XP-19-20 acrylated urethane oligomer (64 g., 62.7 weight %, based on total composition weight) and Vicure 10 photoinitiator (2 g., 2.0 weight %, based on total composition weight). Cargill is a tradename of Cargill, Inc. located in Wayzata, Minn. for a commercially-available polymerizable acrylated urethane oligomer. Vicure 10 is a tradename of Stauffer Chemical Company located in Westport, Conn. for a commercially-available ultraviolet photoinitiator. A sample of this composition was cast into a film 0.15 mm thick and irradiated with ultraviolet light until it was substantially completely crosslinked. The shrinkage of the film was less than 0.1%. The absorbance of the resulting film was 0.045 for visible radiation of a wavelength in the range of 400 to 600 nanometers.

EXAMPLE 2

Crosslinkable Composition

A crosslinkable composition was prepared like that in Example 1 except the acrylated urethane oligomer used was Chempol 19-4824. Chempol is a tradename of Freeman Chemical Corporation located in Port Washington, Wis. for a commercially available polymerizable acrylated urethane oligomer. A sample of this composition was cast into a film 0.17 mm thick and irradiated with ultraviolet light until it was substantially completely crosslinked. The resulting film had a negligible amount of shrinkage and an absorbance of 0.09 for visible radiation of a wavelength in the range of 400 to 600 nanometers.

EXAMPLE 3

Optical Lens Prepared by UV Irradiation Curing

A sample of the crosslinkable composition described in Example 1 was cast into a stainless steel mold 0.32 cm. (0.125 in.) deep. The composition was then irradiated with ultraviolet light from a commercially available Ashdee UV-25 processor at 20 ft./min. The radiation dosage was about 1.5 joules/cm$^2$. The resulting lens had a negligible amount of shrinkage and an absorbance of about 0.06 for visible radiation of a wavelength in the range of from 400 to 600 nanometers.

EXAMPLE 4

Optical Lens Prepared by Heat Curing

A crosslinkable composition was prepared by combining 1,6-hexanediol diacrylate (10 g., 9.8 weight %, based on total composition weight), Cargill XP-19-20 acrylated urethane oligomer (90 g., 88.2 weight %, based on total composition weight) and 2,2'-azobis-(isobutyronitrile) curing catalyst (2 g., 2 weight %, based on total composition weight). A sample of this composition was cast into a mold as described in Example 3 and cured by heating to 90° C. and maintaining the composition at that temperature for 30 minutes. The resulting lens had a negligible amount of shrinkage and an absorbance of about 0.07 for visible radiation of a wavelength in the range of from 400 to 600 nanometers.

This invention has been described in detail with particular reference to certain preferred embodiments thereof, but it will be understood that variations and modifications can be effected within the spirit and scope of the invention.

What is claimed is:

1. An optical lens having an absorbance of less than about 0.1 for visible radiation of a wavelength in the range of from about 400 to about 600 nanometers, said lens having been prepared by
   introducing into a lens-forming means a crosslinkable composition consisting essentially of: (1) an acrylic monomer having the formula

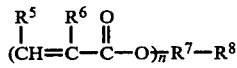

wherein n is 1 to 3; each of $R^5$ and $R^6$ is hydrogen, methyl or halo; $R^7$ is a polyvalent aliphatic, alicyclic or aromatic group, and $R^8$ is hydrogen or

and (2) an acrylated urethane oligomer having the formula

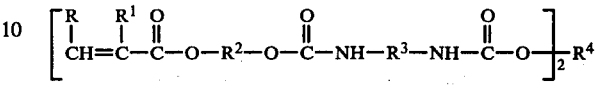

wherein each of R and $R^1$ is hydrogen, methyl or halo; each of $R^2$ and $R^3$ is alkylene, cycloalkylene or arylene; and $R^4$ is a divalent aliphatic, alicyclic or aromatic radical, said composition exhibiting a shrinkage upon curing of less than about 0.4%, and
   curing said composition in said lens-forming means until it is substantially crosslinked.

2. The optical lens of claim 1 wherein said composition consists essentially of from about 5 to about 35 percent, by weight, of said acrylic monomer and from about 65 to about 95 percent, by weight, of said acrylated urethane oligomer.

3. The optical lens of claim 1 wherein each of R and $R^1$ is hydrogen; $R^2$ is alkylene; $R^3$ is arylene; and $R^4$ is alkylene, cycloalkylene or arylene.

4. The optical lens of claim 3 wherein $R^3$ is phenylene and $R^4$ is alkylene.

5. The optical lens of claim 1 wherein n is 2; each of $R^5$ and $R^6$ is hydrogen; $R^7$ is alkylene and $R^8$ is hydrogen.

6. The optical lens of claim 1 which is a single component lens.

7. The optical lens of claim 1 having a thickness of from about 0.08 to about 2.6 centimeters.

8. The optical lens of claim 1 having an absorbance of less than about 0.075 for visible radiation of a wavelength in the range of from about 400 to about 600 nanometers.

9. The optical lens of claim 1 wherein said acrylated urethane oligomer has the formula:

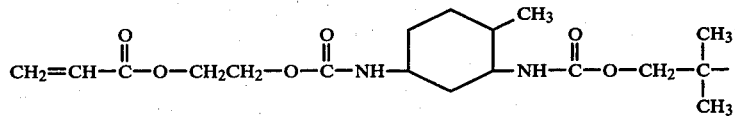

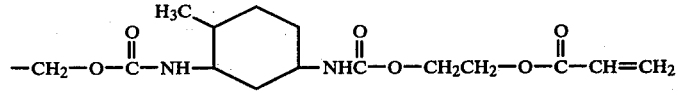

and said acrylic monomer is 1,6-hexanediol diacrylate.

* * * * *

UNITED STATES PATENT AND TRADEMARK OFFICE
CERTIFICATE OF CORRECTION

PATENT NO. : 4,376,800
DATED : March 15, 1983
INVENTOR(S) : Chen-i Lu and Edward D. Morrison It is certified that error appears in the above—identified patent and that said Letters Patent is hereby corrected as shown below:

On the title page, directly beneath the names of the inventors, insert:

-- Assignee: Eastman Kodak Company, Rochester, N. Y. --

Signed and Sealed this

Fifth Day of July 1983

[SEAL]

Attest:

GERALD J. MOSSINGHOFF

Attesting Officer     Commissioner of Patents and Trademarks